US010788393B2

(12) United States Patent
Tan et al.

(10) Patent No.: US 10,788,393 B2
(45) Date of Patent: Sep. 29, 2020

(54) SYSTEM AND METHOD FOR INSPECTING OPTHALMIC LENSES

(71) Applicant: EMAGE VISION PTE. LTD, Singapore (SG)

(72) Inventors: Bee Chuan Tan, Singapore (SG); Lew Siang Charles Cher, Singapore (SG)

(73) Assignee: EMAGE VISION PTE. LTD, Singapore (SG)

( * ) Notice: Subject to any disclaimer, the term of this patent is extended or adjusted under 35 U.S.C. 154(b) by 436 days.

(21) Appl. No.: 15/311,370

(22) PCT Filed: May 12, 2015

(86) PCT No.: PCT/SG2015/050108
§ 371 (c)(1),
(2) Date: Nov. 15, 2016

(87) PCT Pub. No.: WO2015/174927
PCT Pub. Date: Nov. 19, 2015

(65) Prior Publication Data
US 2017/0082522 A1 Mar. 23, 2017

(30) Foreign Application Priority Data
May 15, 2014 (SG) .............................. 10201402344P

(51) Int. Cl.
*G01M 11/02* (2006.01)
*G06T 7/00* (2017.01)
(Continued)

(52) U.S. Cl.
CPC .... *G01M 11/0278* (2013.01); *G01M 11/0214* (2013.01); *G01N 21/958* (2013.01);
(Continued)

(58) Field of Classification Search
CPC .......... G01N 21/8806; G01N 21/9501; G01N 21/956; G01N 2021/95676; G01N 21/21;
(Continued)

(56) References Cited

U.S. PATENT DOCUMENTS 3,988,068 A * 10/1976 Sprague ............. G01M 11/0278
356/124
5,500,732 A 3/1996 Ebel et al.
(Continued)

FOREIGN PATENT DOCUMENTS

CN 1987528 A 6/2007
CN 101308241 A 11/2008
(Continued)

OTHER PUBLICATIONS

English Machine Translation of CN101308241A dated Nov. 19, 2008.
English Machine Translation of Abstract of CN1987528A dated Jun. 27, 2007.

*Primary Examiner* — Dave Czekaj
*Assistant Examiner* — Kehinde Abimbola
(74) *Attorney, Agent, or Firm* — King & Shickli, PLLC

(57) ABSTRACT

A system for inspecting an ophthalmic lens comprising an optical connection: an illumination source 60, wherein the light source is arranged to project the light to wards the ophthalmic lens held in the holder; an optical lens 83, wherein the lens is arranged to condition and project the light beam to illuminate the lens; a swivel glass plate 40, which is arranged to move in and out of the optical axis 110; a bright field imaging unit, wherein the bright field imaging unit is arranged to capture an image projected by the illumination source 60; a dark field imaging unit, wherein the dark field imaging unit is arranged to capture an image projected by the illumination source 60; and at least one camera sensor operatively coupled with the swivel glass (Continued)

plate, wherein the at least one camera sensor is arranged to capture an image of the light penetrating through the optical lens 83 contained at the bottom of the container 50 and the optical module 20 positioned in line with the optical axis 110.

22 Claims, 3 Drawing Sheets

(51) Int. Cl.
*H04N 5/225* (2006.01)
*H04N 5/372* (2011.01)
*G01N 21/958* (2006.01)

(52) U.S. Cl.
CPC ......... *G06T 7/0004* (2013.01); *H04N 5/2254* (2013.01); *H04N 5/2256* (2013.01); *H04N 5/372* (2013.01); *G01N 2021/9583* (2013.01)

(58) Field of Classification Search
CPC ........... G01N 15/1434; G01N 15/1475; G01N 2015/1486; G01N 2015/1497; G01N 2021/8472; G01N 2021/8816; G01N 23/2251; G01N 21/95607; G01N 2201/0636; G01N 2223/611; G01N 21/47; G01N 21/958; G01N 2201/062; G01N 21/4788
See application file for complete search history.

(56) References Cited

U.S. PATENT DOCUMENTS

| | | | |
|---|---|---|---|
| 5,633,504 A * | 5/1997 | Collins | G01N 21/64 250/459.1 |
| 5,686,959 A * | 11/1997 | Hayashi | H04N 1/00002 324/760.01 |
| 5,689,341 A * | 11/1997 | Hayashi | G02F 1/1309 356/418 |
| 5,717,781 A | 2/1998 | Ebel et al. | |
| 5,748,300 A | 5/1998 | Wilder et al. | |
| 5,805,276 A | 9/1998 | Davis et al. | |
| 6,296,977 B1 | 10/2001 | Kaise et al. | |
| 6,765,661 B2 | 7/2004 | Biel et al. | |
| 7,388,679 B2 | 6/2008 | Yoshino et al. | |
| 7,477,383 B2 | 1/2009 | Furman et al. | |
| 7,633,041 B2 | 12/2009 | Furman et al. | |
| 7,830,522 B2 | 11/2010 | Han | |
| 7,843,559 B2 | 11/2010 | Furman et al. | |
| 7,855,782 B2 * | 12/2010 | Biel | G01M 11/02 356/124 |
| 9,506,749 B2 * | 11/2016 | Bellis | G01B 11/2545 |
| 2001/0035949 A1 * | 11/2001 | Epstein | G01M 11/0278 356/124 |
| 2002/0163638 A1 | 11/2002 | Biel et al. | |
| 2003/0053675 A1 * | 3/2003 | Kuwabara | G06T 7/001 382/145 |
| 2005/0122508 A1 * | 6/2005 | Uto | G01N 21/956 356/237.2 |
| 2006/0163491 A1 * | 7/2006 | Angal | G01N 21/6456 250/458.1 |
| 2007/0121109 A1 | 5/2007 | Biel et al. | |
| 2007/0139640 A1 * | 6/2007 | Biel | G01M 11/02 356/124 |
| 2008/0291436 A1 | 11/2008 | Aiko et al. | |
| 2010/0157289 A1 * | 6/2010 | Biel | G01M 11/02 356/124 |
| 2011/0221886 A1 * | 9/2011 | Nishiyama | G01N 21/94 348/126 |
| 2012/0120412 A1 * | 5/2012 | Bellis | G01B 11/25 356/603 |

FOREIGN PATENT DOCUMENTS

| | | |
|---|---|---|
| EP | 2163842 B1 | 8/2014 |
| JP | 2007078581 A | 3/2007 |
| JP | 2012073073 A | 4/2012 |
| WO | 9926052 A2 | 5/1999 |
| WO | 03073061 A2 | 9/2003 |
| WO | 2015053712 A1 | 4/2015 |

* cited by examiner

SYSTEM AND METHOD FOR INSPECTING OPTHALMIC LENSES

The present invention relates to an inspection system to automatically inspect ophthalmic lens, preferably in an automated ophthalmic lens production line. The inspection system provides an imaging unit and an inspection method using said swivel plate mechanism designed to capture multiple images and subsequently recognize defective lenses effectively and efficiently with a very high degree of accuracy and reliability.

TECHNICAL FIELD

The present invention generally relates to an automated inspection system and more specifically to a process and method for inspecting ophthalmic lenses.

Ophthalmic lens is extensively used and in high demand. It has created a need to produce very high quality lenses, both standard and cosmetic, in large quantities. It is a generally a known fact that lenses produced in an automated manufacturing line are more reliable than those manufactured by a manual system of production which suffer from unpredictable problems. It is also a widely accepted fact that inspection systems are an essential part of an automated manufacturing line to inspect the lenses and maintain a consistent and high quality inspection process to deliver premium quality product to customers. Regular tweaking of inspection parameters and generating configuration files that comprise of inspection characteristics, for various ophthalmic lens models, enables flexible adaptation of the inspection system. Ophthalmic lenses are intended for use in the human eye not just to correct the vision but also to enhance the cosmetic look of the eye by printing designs on the ophthalmic lens. Therefore great care must be taken to ensure that they are defect free and also ensure minimum handling occurs during the inspection process. These ophthalmic lenses are produced in very high volumes in an automated manufacturing line. In order to ensure that each one of the lenses is manufactured as per strict quality control standards, it is essential that the lenses are inspected just before packaging, using automated inspection methods. It is also common to implement inline inspection before packaging, so the ophthalmic lenses need not be moved away from the manufacturing line. The present invention is designed such that it may be incorporated into existing lens manufacturing lines or into standalone inspection systems.

The Opthalmic lenses are usually placed in lens holders, which are transparent. Each holder holds one lens, which is generally immersed in a liquid solution. The wet lens inside the holder is inspected as the lens carrier moves along a transport system in an automated manufacturing line. In order to increase the throughput of the manufacturing line, it is essential that the lenses are inspected as quickly as possible.

BACKGROUND OF INVENTION

Prior arts disclose different techniques of inspection of contact lenses wherein the lens holder is filled with saline solution with the contact lenses floating therein. The consistency of the inspection is a very important requirement for effective and accurate determination of defects. Inspection systems disclosed generally an optical system which is designed with a fixed depth of focus. The depth of focus is so determined in relation to the thickness of the lens as the primary guiding parameter. The objective of such an optical system is to ensure the entire lens from the edge of the lens to the bottom of the lens is in focus. In most cases the images captured by inspection system having adequate depth of focus, provide optimally enhanced images where any contamination or bubbles within the lens material is easily detected and measured to determine if it is reject or not. The problem with such inspection systems is when the size of a defect criterion falls in a region where a definitive decision cannot be made. In current systems with the production line mainly prevalent in clean rooms, the size of the defects found in lenses and the saline solution is getting smaller and smaller. A wrong decision can either lead to a faulty product being shipped to the customer or the manufacturer ending up with a lot of rejects. This excessive rejection can have a significant impact on the productivity of the manufacturing line. The issue is more pronounced if the defect to be measured varies in less than tens of microns. To overcome over rejection, many prior arts resort to extensive algorithm processing to manipulate the image, which is time consuming, thus rendering the process to become slow and low production volumes.

In prior art inspection systems used to check the quality of the ophthalmic lens, the optical modules utilised, condition the illumination for a particular purpose such as for detecting foreign particle, diameter or other defects in the lens. There is no option to change the optical characteristics dynamically. Any changes that are possible is limited to illumination, if such a feature is available. While optical modules can be re-configured for a set batch of objects, they cannot be re-configured dynamically for each and every object or for objects that may need enhanced inspection as the nature of defect may be such that, it may be difficult to accurately determine the type of defect without capturing different set of images to aid further analysis. This enhancement feature in inspection is required especially if the over rejection rate needs to be reduced for better productivity.

Prior art systems that acquire only a single image or multiple images by only varying illumination characteristics are susceptible to high false rejection rates, which may be due to the inability to determine whether a potential defect in the lens is actually a defect of the lens, or whether it is debris. Accordingly, these systems may have high false rejection rates (e. g., rejection of lenses that were placed in a holder with contaminated Saline solution), or may accept lenses that have small, but significant, defects within the lens. There are also no options to clean the Saline solution that is filled in the lens holder. Unclean or dirty saline solution affect the quality of inspection and increases the inspection time significantly as the software has to perform more analysis of the image in the event of foreign material contamination in the saline.

Further, it has been found that in prior art systems, there is no option to capture multiple images of the same object at different focal points which makes analysis of certain types of defects difficult. Images captured at different focal points has the advantage of highlighting certain defects better than if it were captured at a single focal point. The lack of such enhanced images, results in complex algorithms being deployed to minimise over rejection or under rejection which affects productivity. It is therefore essential to obtain multiple images of the same object with different focal points to be able to accurately and effectively differentiate between an actual defect and a false alarm.

Further, many prior art systems utilise multiple cameras and multiple illumination systems which suffer from maintenance issues. It is difficult to obtain consistency across all the cameras, optics and illumination systems as they have inherent product variations which add up to the inconsistencies. In addition, a breakdown or fault occurring in one optical system, results in the complete sub assembly being shut down. Using a single camera and optical system though slower, ensures good consistent performance and quick changeover to different product types when compared to multi-inspection module systems. There is therefore a need for capturing and inspecting multiple images under different optical characteristics in combination with multiple illumination wavelengths to provide an enhanced capability to detect defects that are very small, to minimise over-rejection. This is the objective of the present invention.

SUMMARY

It is an object of the present invention to provide an automated apparatus for inspecting contact lenses.

It is further an object of the present invention to provide an automated apparatus for inspecting contact lenses that are suspended in a saline solution.

It is further an object of the present invention to provide an automated apparatus for inspecting contact lenses by ensuring a consistent amount of Saline solution to be dispensed in the lens holder to eliminate any captured image variations due to inconsistent Saline solution volumes.

It is further an object of the present invention to provide an automated apparatus for inspecting an ophthalmic lens comprising a movable swivel glass plate consisting of at least one lens, that may be positioned in line with the optical axis 110 (FIG. 1).

It is further an object of the present invention to provide an automated apparatus for inspecting an ophthalmic lens comprising a swivel glass plate that consists of multiple lenses, each having a different optical characteristic. Primarily each lens of the Swivel plate acts to shift the focal point to a different location. The images acquired with and without the swivel glass would specifically aid in the inspection of small defects in the lens, which would otherwise be faded or masked in a standard image. The swivel glass plate is rotated around its centre, to position different lenses embedded in the swivel plate, in line with the optical axis 110 (FIG. 1) to capture multiple images.

It is an object of the present invention to provide an automated illumination apparatus consisting for different wavelength of light emitters to be incorporated into the illumination module. These illumination modules are configured to be able to dynamically select a particular wavelength followed by a single strobe signal to capture the image of the object under inspection.

It is further an object of the present invention to provide a method for inspecting an ophthalmic lens comprising using a swivel glass plate. Preferably the method further comprises of capturing at least one dark field image and at least one Bright field image. Even more preferably the method allows selectively employing the swivel glass plate to capture at least one dark-field image or at least one Bright field image.

It is further an object of the present invention to provide an improved method of inspecting contact lenses to differentiate between foreign matter or bubbles and actual defects on the lenses.

It is further an object of the present invention to provide an improved method for inspecting contact lenses by ensuring an accurate dispensing of Saline solution to the lens holder.

In still another aspect of invention, the present invention provides a device and method to capture and inspect multiple dark field and Bright field images, of the object that are printed, tinted or a simple transparent ophthalmic lenses.

While the invention is described with particular reference to contact lenses, it is understood the present consolidation apparatus is equally suitable for non-hydrated lens inspection as well.

BRIEF DESCRIPTION OF THE DRAWINGS

The foregoing objects and advantages of the present invention for an automated apparatus and method for inspecting contact lenses may be more readily understood by one skilled in the art with reference to the following detailed description of the preferred embodiments, taken in conjunction with the accompanying drawings, wherein like elements are designated by identical reference numerals throughout the several views.

Other arrangements of the invention are possible, and consequently the particularity of the accompanying drawings is not to be understood as superseding the generality of the preceding description of the invention.

Further details and advantages of the invention may be seen from the description and drawings that follow.

DETAILED DESCRIPTION OF THE PREFERRED EMBODIMENTS

According to the present invention, a preferred embodiment will be described, with reference to the drawings mentioned.

The system of the present invention uses a single camera, an optical module, a lens holder and an illumination module, a accurate Saline solution volume dispenser (not, shown), suitably integrated with a Swivel glass plate comprising a multiple lenses arranged in a circular fashion, to capture high-resolution images of the object, at different focal points. The object is illuminated by a single illumination module that is designed using varied wavelengths and may also be of different polarization.

References in the prior art do not refer to defocussed images that have been found to be very useful in differentiating defects which can be mistaken for contamination or otherwise. The optical mechanism in conjunction with the swivel glass plate translates very minute defects.

In a preferred aspect of the invention, an imaging unit comprising a single camera, an optical module, the lens holder, the Swivel Glass plate mechanism in combination with the illumination module to capture Dark field and Bright field images provides an accurate inspection system.

Figure 1:
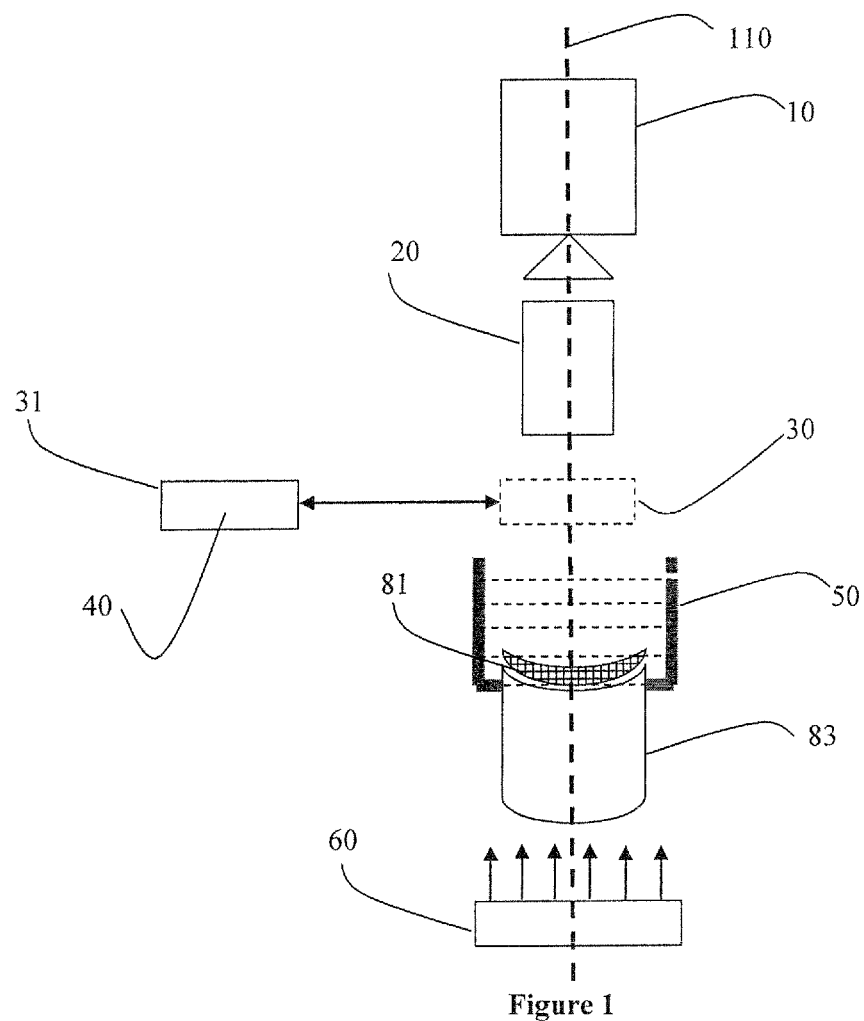
FIG. 1 is an illustration of the optical and illumination system according to the present invention.

It may be noted that the present invention is directed towards an imaging system that uses a single imaging device and a dynamically configurable illumination system that enable a highly accurate and sharply focused image of the defects (ophthalmic lens) suitably integrated with a mechanism to capture a defocused image by the introduction of a swivel glass in the optical axis 110 (FIG. 1). Only then, is the said images can be efficiently utilised to detect minute features or defects in a ophthalmic lens that includes but not limited to tears, cuts, bubbles, inclusions, ruptures, deformities, dimensional defect and foreign material contamination.

In another embodiment of the invention, the illumination module 60 is strobed at different instances in the time domain and the corresponding images are captured.

In another embodiment of the invention, the illumination module 60 can be programmed to selectively strobe the illumination at different intensities and the corresponding dark field or Bright field images, as captured as per the light setting.

In another embodiment of the invention, a specific illumination wavelength may be configured to inspect different features such as print quality, foreign material and edge defects.

In yet another embodiment of the present invention, the illumination module containing different wavelengths of LEDs, may be selectively turned OFF/ON depending upon the type of defects to be inspected.

The illumination controller (not shown) may be CPU controlled, to change the intensity and pulse duration of the strobe. The CPU may also control the timing of the trigger pulse synchronization with respect to the camera shutter to get a consistent image quality. For the purpose of clarity the strobing mechanism and the art of image capture is not discussed, as it is a well-established technology. Images are then moved or copied to different memory locations for further image processing.

The present invention is preferably used in an automated manufacturing line where the specimen (ophthalmic lens) is transported along a predetermined path and positioned under the inspection station for inspection. Preferably the ophthalmic lens may be moving through the inspection system. However, the ophthalmic lens may also be inspected in a stationary position, if the inspection process requires it.

In the foregoing description the invention has been described with reference to specific embodiments thereof. It will, however, be evident that various modifications and changes may be made thereto by a skilled person in the art, without deviating from the broader spirit and scope of the invention. For eg: One such embodiment may be in the form of using a single colour or monochrome camera in conjunction with multiple illumination modules, configured to selectively capture multiple dark field and bright field images of the same object at different time domains which may include the use of a single or multiple Swivel plates. The specification and drawings are, accordingly, to be regarded as illustrative rather than a restrictive sense.

DETAILED DESCRIPTION OF DRAWINGS

The present invention was designed for and is particularly adapted for use in contact lenses molded section of an automated production line.

According to the present invention, a preferred embodiment will be described with reference to the drawings mentioned.

Figure 2:
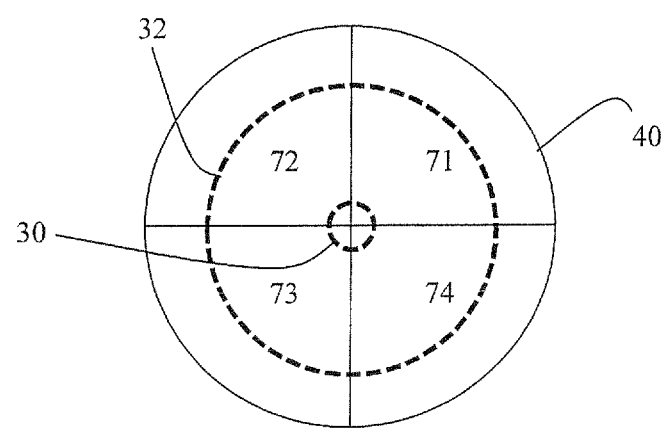
FIG. 2 is a plan view of the swivel glass 30 as indicated in FIG. 1.

The system of the present invention illustrated in FIG. 1 uses a single camera 10 and an optical module 20 to capture high-resolution images of the object 81 that is illuminated using multiple wavelengths of illumination incorporated in single illumination module 60. In addition, the optical system 20 may contain option to incorporate colour filters to reject parasitic illumination interfering into the inspection area. The system also enables capturing multiple high-resolution images of the same object under different optical characteristics by introducing a swivel glass 40 in the optical axis 110 (FIG. 1). The swivel glass 40 may consist of "N" areas of different optical characteristics for focussing the illumination at different points to enable a multiple types of defects to be highlighted The swivel glass 40 illustrated in FIG. 2 is divided into four areas of different optical focus points 71,72, 73, 74 and so on, which may be positioned in the path of the optical axis 110 (FIG. 1) to enable capturing of different images. Depending on the illumination parameters, either Dark Field or Bright field images may be captured using the package configurations selected by the user.

Figure 3:
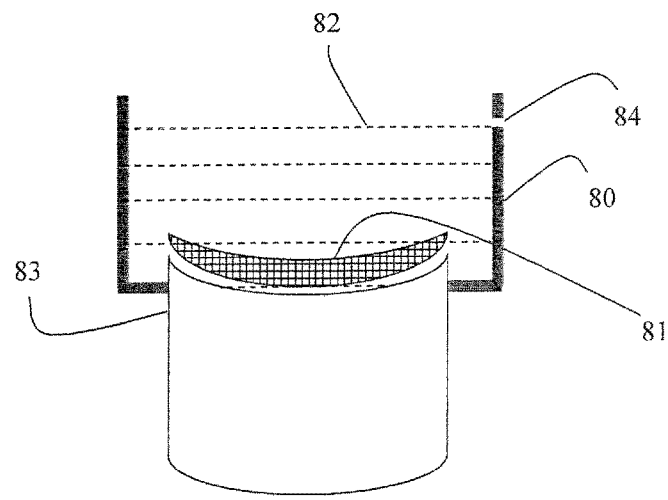
FIG. 3 is an enlarged cross sectional view of the ophthalmic lens holder assembly 50 as indicated in FIG. 1.

The lens holder setup shown in FIG. 3 consists of a holder 80 with an outlet 84 for excess Saline solution outflow. The holder 80 has lens 83 which forms the bottom surface of the lens receiving cavity that positions the object 81 to be inspected. A accurate saline dispensation device that injects saline solution 82, into the cavity 80 is not shown.

The lens receiving cavity consists of the holder 80 and a lens 83 that is preferably made of clear glass with no coating on its bottom surface. The lens 83 enables illumination of the lens 81 from the bottom by illuminating module 60 (in FIG. 1). The concave curvature of lens 83 shown in FIG. 3 closely matches that of the convex surface of the lens 81 such that the lens 81 always moves to the centre of the lens receiving cavity. This feature helps inspection algorithm to locate the edge of the lens quickly, to ensure better throughput of the inspection system.

Figure 4:
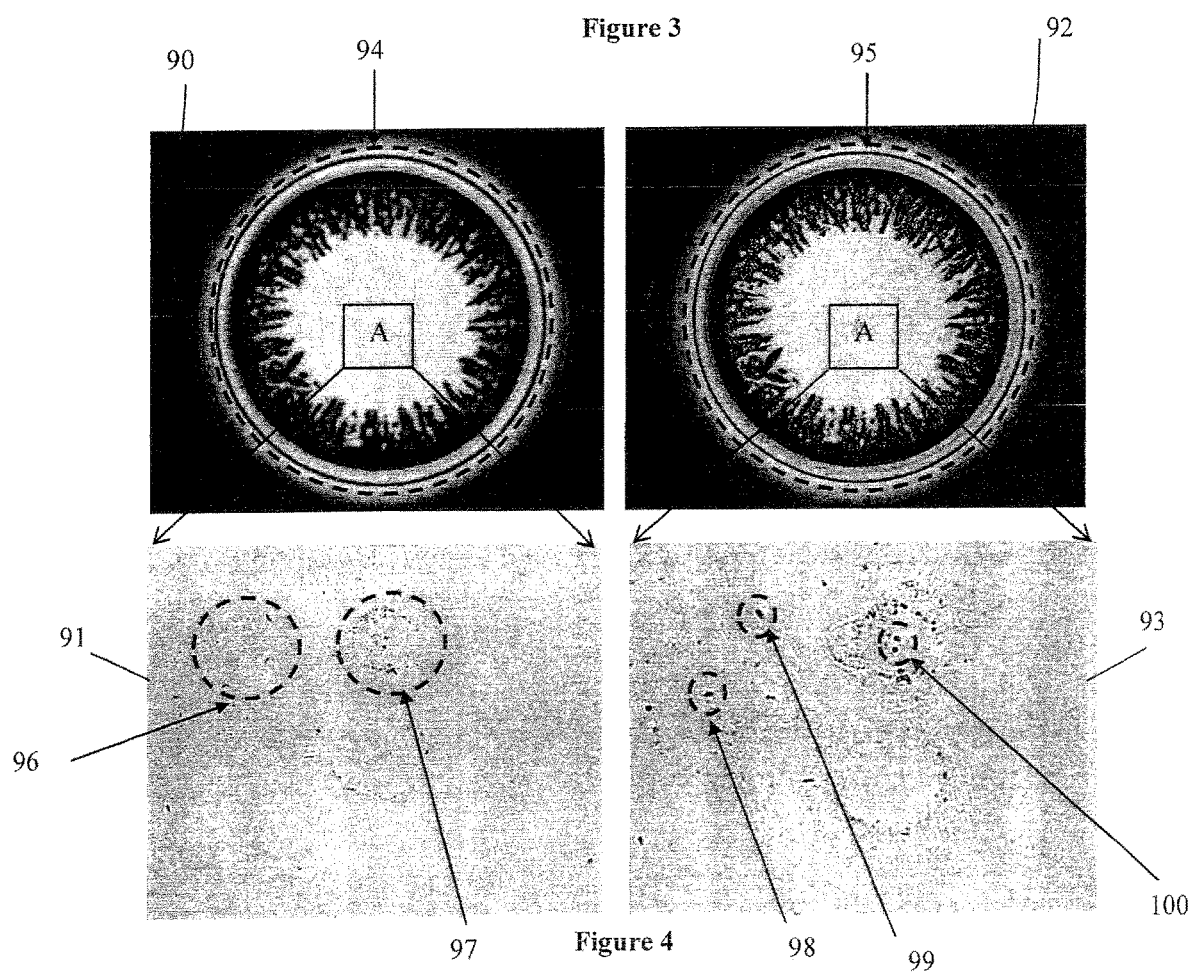
FIG. 4 shows Dark Field and Bright field images of ophthalmic lens, showing the de-focussing effect of the swivel glass.

In a preferred embodiment of the present invention an example is described. FIG. 4 shows a dark field image 90 of an ophthalmic lens captured with the Swivel glass 40 located in position 31. Upon further analysis of area A in image 90, a probable defect as indicated at position 96 and 97 is shown in enlarged image 91. In such cases whereby it is difficult to differentiate between contamination and an actual defect in the lens, the swivel glass is moved to position 30, in line with the optical axis 110 (FIG. 1). Furthermore the software determines the level of defocussing needed to enhance the defects and the appropriate lens position (71,72,73,74) as determined by the software program is positioned, by rotating the swivel plate 40. Further, new image is captured by strobing the illumination module resulting in image 92. Subsequently the same area A is shown in the enlarged image 93. The Swivel glass produces the effect of enhancing certain types of defects. The dark spots 96 and 97 viewed in the image 91 where they appear faint, is now enhanced as shown in image 93. The defects 96 and 97 indicated in 91 appear much larger and more pronounced as indicated by 98, 99 and 100. As evident, by applying the same analysis that was applied to image 91, to the image 93, the software is able to accurately and consistently decide the nature of the defect and if the object under inspection is a Pass or a Reject.

Figure 5:
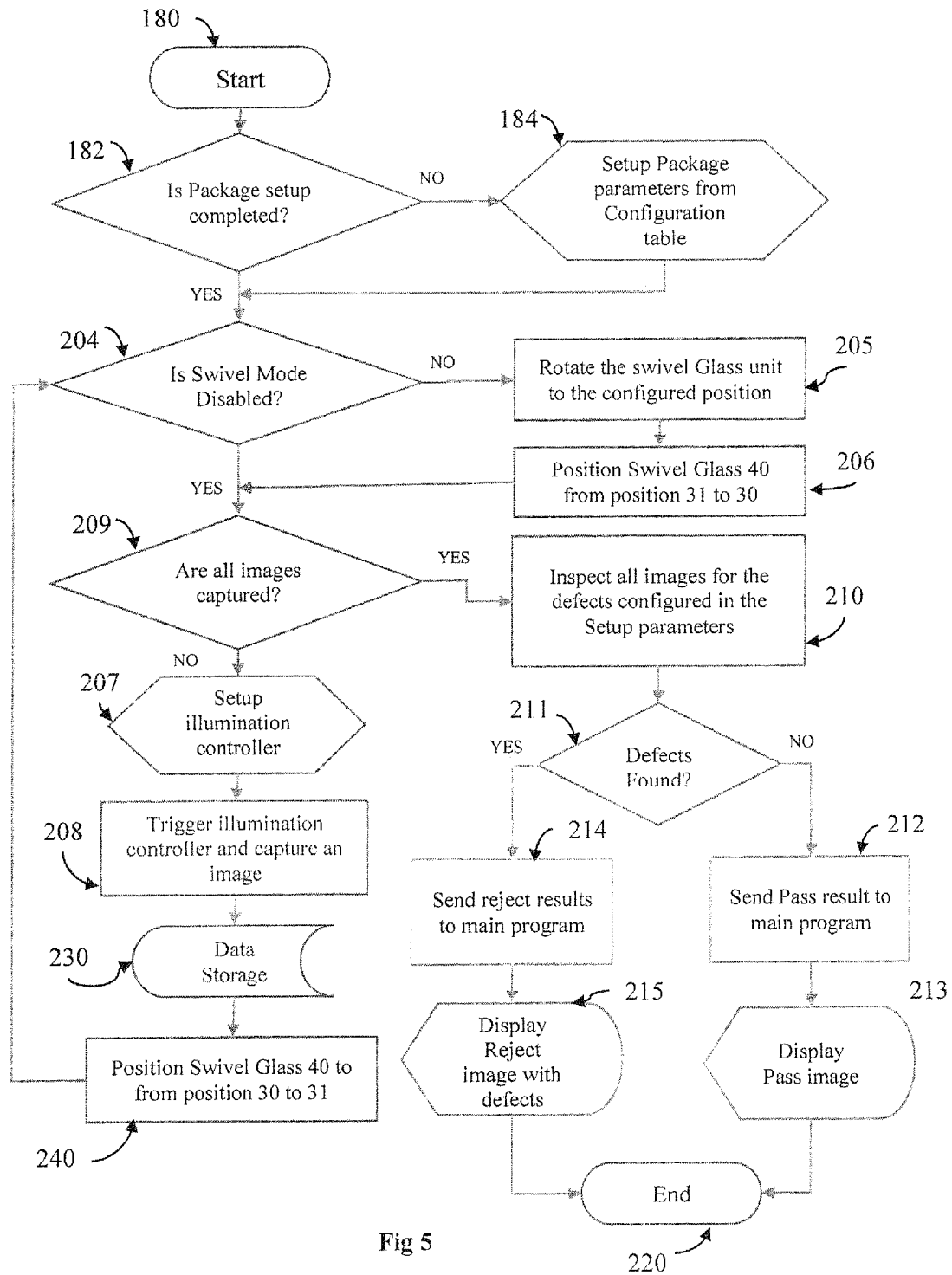
FIG. 5 shows a typical flow chart of the inspection process.

Let us refer to FIG. 5. It shows the flow chart for the process of inspection. The program begins at process step 180. The program checks if a package type has been configured for inspection at step 182. If a package has already been configured the program moves to step 204. However if there is no package type selected, then the program moves to step 184 to begin the process of Package setup. The package setup may consist of selecting a previously configured package type or may involve the steps of configuring a new package type that may include all the parameters related to the ophthalmic lens which includes diameter, Pattern template, logo position, Logo type, critical areas on the lens and the grey scale value of user selected areas. For the purpose of clarity, the setup process is not discussed in detail. When the package setup is completed, the program moves to step 204. The program checks if the Swivel Mode is disabled at step 204. Swivel mode is a mode where the Swivel glass 40 (FIG. 1) is moved from position 31 to position 30 in line with the optical axis 110 (FIG. 1) before an image is captured. A person skilled in the art will realise that the swivel plate 40 is positioned around the centre of axis in the area 30 (FIG. 2), if the lens used in the swivel glass plate is of a single characteristic. If the plate 40 has multiple lens embedded in it, the swivel glass is positioned around the perimeter of the circle 32 (FIG. 2) which is offset from the centre of the swivel plate 40. The image captured in the swivel glass plate mode, is to produce a shift in the focal point so an enhanced image of the object 81 is captured. The swivel glass shown in FIG. 2 constitutes multiple areas with different lenses assembled in the rotary disk 40 shown in FIG. 2. For e.g. Lenses 71, 72, 73 and 74 are assembled in four different quadrants of the disk. The disk in FIG. 2 shows four quadrants but, a person skilled in art will realise that many more lenses can be incorporated in disk 40 depending upon the inspection requirements of a package type. A person skilled in the art will recognise the fact the Swivel glass plate can also consist of one single lens. If the Swivel mode check at step 204 is found to be enabled, the program proceeds to step 205, wherein the Swivel glass mechanism is instructed to rotationally position the plate 40 to a pre-selected area depending upon the configured parameters for the selected package type. After completion of rotation, the Swivel glass is moved from position 31 to position 30 in step 206 and subsequently proceeds to step 209. If the Swivel mode check at step 204 is found be disabled, the program proceeds to step 209.

In step 209, the program checks if the programmed number of images has been captured. If the said number of images is not captured, the program moves to step 207. It may be noted here that the number of images to be captured can be either preset or determined dynamically during program execution and inspection. In step 207, the program sets up the illumination controller 60 for parameters such as intensity and the segments that are required to be illuminated based on the configured parameters. The illumination controller 60 setup involves sending a string of instructions from the PC (not shown), either through a serial link (RS232) or via Ethernet, to the illumination controller 60 which in turn interprets the instructions and performs the necessary steps to configure the hardware. Details of configuring the hardware is not described as it falls beyond the scope of this invention.

Upon completion of setup in step 207, the program proceeds to step 208 where a trigger is sent to the illumination controller and the camera 10, to capture an image. After capturing an image, the program stores the captured image in 230 and moves to the next step 240 where the Swivel glass is moved from position 30 to position 31. Subsequently the program moves to step 204 and repeats the process.

In step 209, if the program checks and determines that the programmed number of images has been captured, it moves to step 210.

At step 210, the program identifies the lens profile using edge finding algorithms. Once the edge is identified the position is logged. Referring to FIG. 4, the lens edge 94 is shown in image 90 by the outer dashed circle.

A first method relies on the lens structure and its characteristics. In this method, a concentric area of lens as shown in FIG. 4 from the lens edge is selected and a blob locating algorithm detects spots around an area A as shown in FIG. 4. The area enclosed by the box A in image 90 is shown enlarged in image 91. The blobs which may indicate a bubble or a foreign material contaminant is shown by circles 96 and 97 in image 91. As evident, it is not easily detectable as a defect as the size of the blob is out of focus or very small and may be measured as a very small defect. When compared with the reject or accept parameters in the software setup, the measured defect may be too small to be rejected. The program now proceeds to inspect all the images captured and logs the defects types and sizes in a table. After completing inspection of all the images, a decision as to whether the defects falls above or below the threshold limit is made. As described earlier all parameters are setup during configuring a particular package type. Defects sizes and types falling above the threshold are rejected and the rest are accepted as Pass.

If the object under inspection is determined to be a defect, the step 214 is initiated along with a display shown on the monitor at step 215, indicating the failure type and subsequently moves to step 220, to the end of the program. However, if the defect is determined to be within the parameters set by the user in the program, the program moves to step 212, with a display shown on the monitor at step 213. Subsequently, the program moves to step 220, to the end of the program.

While processing method explained in the foregoing paragraph enables easy detection of foreign material or other types of contamination, a person skilled in the art will realize, the software algorithm can be configured to measure other types of inclusions at different areas of the lens.

The method described above is suitable to inspect all kinds of ophthalmic lenses, preferably soft conventional hydrogel contact lens, comprising poly-HEMA homo or copolymer, a PYA homo or copolymer, or a cross linked polyethylene glycol or polysiloxane hydrogel.

Although reference to preferred and exemplary embodiments of the present invention has been described, but the skilled person will understand that various modifications, additions, deletion is possible without deviating from the objective of the inspection.

The invention claimed is:

1. A system for inspecting an ophthalmic lens comprising an optical connection:
  an illumination source 60 arranged to select different wavelengths according to a defect to be inspected wherein the light source is arranged to project the light towards the ophthalmic lens held in the holder;
  an optical lens 83, wherein the lens is arranged to condition and project the projected light to illuminate the ophthalmic lens;
  a swivel glass plate 40, which is arranged to move in and out of the optical axis 110 wherein the swivel glass plate is arranged to shift a focal point of illumination projected through the ophthalmic lens;
  a bright field imaging unit, wherein the bright field imaging unit is arranged to capture an image projected by the illumination source 60;
  a dark field imaging unit, wherein the dark field imaging unit is arranged to capture an image projected by the illumination source 60; and
  at least one camera sensor operatively coupled with the swivel glass plate, wherein the at least one camera sensor is arranged to capture an image of the projected light penetrating through the optical lens 83 contained at the bottom of the container 50 and the optical module 20 positioned in line with the optical axis 110, such that the projected light enters the ophthalmic lens so as to detect defects in said ophthalmic lens; and wherein the captured images are captured under different focal point characteristics in combination with different wavelengths.

2. The apparatus of claim 1, wherein the holder contains a volume of saline solution.

3. The apparatus of claim 1, wherein the light source includes different wavelengths of light emitting diodes.

4. The apparatus of claim 1, wherein the light source includes segments.

5. The apparatus of claim 1, wherein the apparatus is integrated with an inline automated transport system.

6. The apparatus of claim 1, further comprising a dark field imaging configuration, wherein the dark field imaging unit is arranged to display an image projected by the illumination source.

7. The apparatus of claim 1, further comprising a bright field imaging configuration, wherein the dark field imaging unit is arranged to display an image projected by the illumination source.

8. The apparatus of claim 1, wherein the swivel glass plate comprises multiple focal areas positioned around the plate.

9. The apparatus of claim 1, wherein different areas of Swivel glass plate is designed to shift the focal point of light to a different position.

10. The apparatus of claim 8, wherein the swivel plate is controllable to move between two predetermined positions.

11. The apparatus of claim 1, wherein the imaging device is a high resolution CCD camera.

12. A method for inspecting an ophthalmic lens comprising an optical connection:

a illumination source 60 having a plurality of wavelengths, wherein the light source projects the light towards the ophthalmic lens held in the holder;

an optical lens 83 having different optical characteristics, wherein the lens conditions and projects the projected light to illuminate the lens;

a swivel glass plate 40, which can moved in and out of the optical axis 110 wherein the swivel glass plate is arranged to shift a focal point of illumination projected through the ophthalmic lens;

a bright field imaging unit, wherein the bright field imaging unit captures an image projected by an illumination source 60;

a dark field imaging unit, wherein the dark field imaging unit captures an image projected by the illumination source 60; and at least one camera sensor operatively coupled with the swivel glass plate and in cooperation with the illumination source 60 the at least one camera sensor captures an image of the projected light penetrating through the lens 83 contained at the bottom of the container 50 and the optical module 20 positioned in line with the optical axis 110, such that the light enters the ophthalmic lens so as to detect defects in said ophthalmic lens; and wherein the captured images are captured under different focal point characteristics in combination with different wavelengths.

13. The method of claim 12, wherein the holder contains a volume of saline solution.

14. The method of claim 12, wherein the light source is designed with different wavelengths of Light emitting diodes.

15. The method of claim 12, wherein the light source is designed in the form segments.

16. The method of claim 12, wherein the apparatus is integrated with an inline automated transport system.

17. The method of claim 12, further comprising a dark field imaging configuration, wherein the dark field imaging unit displays an image projected by the illumination source.

18. The method of claim 12, further comprising a bright field imaging configuration, wherein the dark field imaging unit displays an image projected by the illumination source.

19. The method of claim 12, wherein the swivel glass plate comprises multiple focal areas positioned around the plate.

20. The method of claim 12, wherein different areas of Swivel glass plate is designed to shift the focal point of light to a different position.

21. The method of claim 12, wherein the swivel plate is controllable to move between two predetermined positions.

22. The method of claim 12, wherein the imaging device is a high resolution CCD camera.

* * * * *